US012401125B2

(12) United States Patent
Yoshikawa

(10) Patent No.: US 12,401,125 B2
(45) Date of Patent: Aug. 26, 2025

(54) ANTENNA AND ARRAY ANTENNA

(71) Applicant: KYOCERA CORPORATION, Kyoto (JP)

(72) Inventor: Hiromichi Yoshikawa, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 125 days.

(21) Appl. No.: 18/553,841

(22) PCT Filed: Dec. 9, 2021

(86) PCT No.: PCT/JP2021/045386
§ 371 (c)(1),
(2) Date: Oct. 4, 2023

(87) PCT Pub. No.: WO2022/224482
PCT Pub. Date: Oct. 27, 2022

(65) Prior Publication Data

US 2024/0113434 A1 Apr. 4, 2024

(30) Foreign Application Priority Data

Apr. 19, 2021 (JP) ................................ 2021-070632

(51) Int. Cl.
*H01Q 9/04* (2006.01)
*H01Q 21/00* (2006.01)

(52) U.S. Cl.
CPC ......... *H01Q 9/0414* (2013.01); *H01Q 9/0457* (2013.01); *H01Q 21/0006* (2013.01)

(58) Field of Classification Search
CPC ............... H01Q 9/0414; H01Q 9/0457; H01Q 21/0006; H01Q 5/378; H01Q 25/005; H01Q 21/10; H01Q 13/08
See application file for complete search history.

(56) References Cited

U.S. PATENT DOCUMENTS

2019/0348749 A1 11/2019 Thai et al.
2020/0044351 A1* 2/2020 Uchimura .......... H01Q 21/0043
2020/0388912 A1* 12/2020 Sudo .................... H01Q 1/2283

FOREIGN PATENT DOCUMENTS

JP 2011155479 A 8/2011
WO 2019210979 A1 11/2019

* cited by examiner

*Primary Examiner* — David E Lotter
(74) *Attorney, Agent, or Firm* — HAUPTMAN HAM, LLP

(57) ABSTRACT

An antenna includes a first resonator extending in a first plane direction; a second resonator spaced apart from the first resonator in a first direction and extending in the first plane direction; a third resonator positioned between the first resonator and the second resonator in the first direction and magnetically or capacitively connected to or electrically connected to each of the first resonator and the second resonator; a reference conductor extending in the first plane direction, positioned between the first resonator and the second resonator in the first direction, and serving as a potential reference of the first resonator and the second resonator; and a feeder line connected to the first resonator. The reference conductor surrounds at least a part of the third resonator in the first plane direction.

13 Claims, 13 Drawing Sheets

ANTENNA AND ARRAY ANTENNA

RELATED APPLICATIONS

The present application is a National Phase of International Application Number PCT/JP2021/045386 filed Dec. 9, 2021, which claims the benefit of priority from Japanese Patent Application No. 2021-070632, filed on Apr. 19, 2021.

TECHNICAL FIELD

The present disclosure relates to an antenna and an array antenna.

BACKGROUND OF INVENTION

Usually, implementation of a compact antenna with a wide band operating frequency by using a planar antenna is difficult.

CITATION LIST

Patent Literature

Patent Document 1: JP 2011-155479 A

SUMMARY

Problem to be Solved

The resonator element as described in Patent Document 1 has a plurality of resonance structures, and an antenna having a high degree of freedom in design is in demand.

The present disclosure provides an antenna and an array antenna having a resonance structure and a high degree of freedom in design.

Solution to Problem

An antenna according to the present disclosure includes a first resonator extending in a first plane direction; a second resonator spaced apart from the first resonator in a first direction and extending in the first plane direction; a third resonator that is positioned between the first resonator and the second resonator in the first direction and is magnetically or capacitively connected to or electrically connected to each of the first resonator and the second resonator; a reference conductor extending in the first plane direction, positioned between the first resonator and the second resonator in the first direction, and serving as a potential reference of the first resonator and the second resonator; and a feeder line connected to the first resonator, in which the reference conductor surrounds at least a part of the third resonator in the first plane direction.

An antenna according to the present disclosure includes a first resonator extending in a first plane direction; a second resonator spaced apart from the first resonator in a first direction and extending in the first plane direction; a reference conductor extending in the first plane direction, positioned between the first resonator and the second resonator in the first direction, and serving as a potential reference of the first resonator and the second resonator; a third resonator that is positioned between the first resonator and the second resonator in the first direction and is magnetically or capacitively connected to or electrically connected to each of the first resonator and the second resonator; a first auxiliary reference conductor positioned between the first resonator and the reference conductor and extending in the first plane direction; a second auxiliary reference conductor positioned between the second resonator and the reference conductor and extending in the first plane direction; a first connection line path that electromagnetically connects the first resonator, the reference conductor, and the first auxiliary reference conductor; and a second connection line path that electromagnetically connects the second resonator, the reference conductor, and the second auxiliary reference conductor, in which the reference conductor surrounds at least a part of the third resonator in the first plane direction.

An array antenna according to the present disclosure includes one or more antennas according to the present disclosure, in which the one or more antennas are arranged in the first plane direction.

Advantageous Effect

According to the present disclosure, an antenna and an array antenna having a resonance structure and a high degree of freedom in design can be provided.

DESCRIPTION OF EMBODIMENTS

Embodiments of the present disclosure will be described in detail with reference to the drawings. The embodiments described below do not limit the present disclosure.

In the following description, an XYZ orthogonal coordinate system is set, and the positional relationship between respective portions will be described by referring to the XYZ orthogonal coordinate system. A direction parallel to an X-axis in a horizontal plane is defined as an X-axis direction, a direction parallel to a Y-axis in the horizontal plane orthogonal to the X-axis is defined as a Y-axis direction, and a direction parallel to a Z-axis orthogonal to the horizontal plane is defined as a Z-axis direction. A plane including the X-axis and the Y-axis is appropriately referred to as an XY plane, a plane including the X-axis and the Z-axis is appropriately referred to as an XZ plane, and a plane including the Y-axis and the Z-axis is appropriately referred to as a YZ plane. The XY plane is parallel to the horizontal plane. The XY plane, the XZ plane, and the YZ plane are orthogonal to each other.

First Embodiment

Configuration of Antenna

Figure 1:
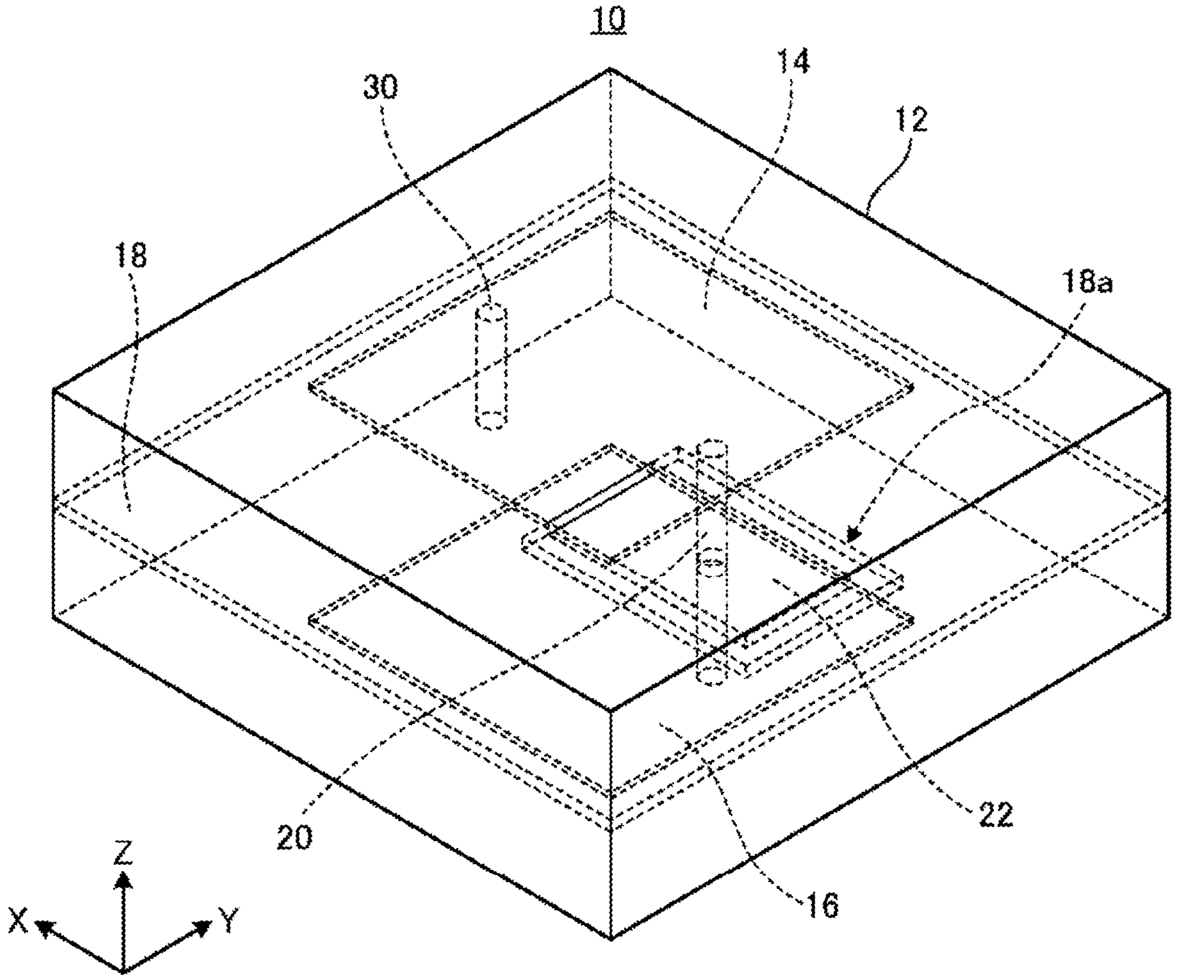
FIG. 1 is a view illustrating a configuration of an antenna according to a first embodiment.

A configuration of an antenna according to a first embodiment will be described with reference to FIG. 1. FIG. 1 is a view illustrating the configuration of the antenna according to the first embodiment.

As illustrated in FIG. 1, an antenna 10 includes a substrate 12, a first resonator 14, a second resonator 16, a reference conductor 18, a connection line path 20, a third resonator 22, and a feeder line 30.

The first resonator 14 can be arranged on the substrate 12 so as to extend in the XY plane. The first resonator 14 can be made of a conductor. The first resonator 14 can be, for example, a patch conductor formed in a rectangular shape. In the example illustrated in FIG. 1, the first resonator 14 is illustrated as a rectangular patch conductor, but the present disclosure is not limited to this. The first resonator 14 may have, for example, a linear shape, a circular shape, a loop shape, or a polygonal shape other than a rectangular shape. That is, the shape of the first resonator 14 can be freely changed depending on the design. The first resonator 14 is configured to resonate by an electromagnetic wave received from the +Z-axis direction.

The first resonator 14 is configured to radiate an electromagnetic wave when resonating. The first resonator 14 is configured to radiate the electromagnetic wave toward the +Z-axis direction when resonating.

The second resonator 16 can be arranged on the substrate 12 so as to extend in the XY plane at a position away from the first resonator 14 in the Z-axis direction. The second resonator 16 can be, for example, a patch conductor formed in a rectangular shape. In the example illustrated in FIG. 1, the second resonator 16 is illustrated as a rectangular patch conductor, but the present disclosure is not limited to this. The second resonator 16 may have, for example, a linear shape, a circular shape, a loop shape, or a polygonal shape other than a rectangular shape. That is, the shape of the second resonator 16 can be freely changed depending on the design. The shape of the second resonator 16 may be the same as or different from the shape of the first resonator 14. The area of the second resonator 16 may be the same as or different from the area of the first resonator 14.

The second resonator 16 is configured to radiate an electromagnetic wave when resonating. The second resonator 16 is, for example, configured to radiate the electromagnetic wave toward the −Z-axis direction. The second resonator 16 is configured to radiate the electromagnetic wave to the −Z-axis direction when resonating. The second resonator 16 is configured to resonate by receiving the electromagnetic wave from the −Z-axis direction.

The second resonator 16 may resonate at a phase different from that of the first resonator 14. The second resonator 16 may be configured to resonate in a direction different from that of the first resonator 14 in the XY plane direction. For example, when the first resonator 14 is configured to resonate in the X-axis direction, the second resonator 16 may be configured to resonate in the Y-axis direction. The second resonator 16 may be configured such that the resonance direction of the second resonator 16 changes over time in the XY plane direction in response to change over time in the resonance direction of the first resonator 14. The second resonator 16 may be configured to radiate an electromagnetic wave with a first frequency band attenuated from the electromagnetic wave received by the first resonator 14. The reference conductor 18 reduces cancellation of a current contributing to radiation when a coupled mode relationship is established among the first resonator 14, the second resonator 16, and the third resonator 22. With reference conductor 18 being present, radiation at the frequency of each coupled mode is performed.

The reference conductor 18 can be arranged between the first resonator 14 and the second resonator 16 on the substrate 12. The reference conductor 18 can be, for example, at the center between the first resonator 14 and the second resonator 16 on the substrate 12, but the present disclosure is not limited thereto. For example, the reference conductor 18 may be at a position where the distance between the reference conductor 18 and the first resonator 14 differs from the distance between the reference conductor 18 and the second resonator 16. The reference conductor 18 has an opening 18*a*. The reference conductor 18 is configured to surround at least a part of the connection line path 20.

The connection line path 20 can be made of a conductor. The connection line path 20 is located between the first resonator 14 and the second resonator 16 in the Z-axis direction. The Z-axis direction can also be referred to as a first direction, for example. The connection line path 20 can be connected to each of the first resonator 14 and the second resonator 16. The connection line path 20 can be configured integrally with the third resonator 22. The connection line path 20 can be configured to be magnetically or capacitively connected to each of the first resonator 14 and the second resonator 16, for example. For example, the connection line path 20 may be configured to be electrically connected to each of the first resonator 14 and the second resonator 16. The connection line path 20 is connected to a side of the first resonator 14 parallel to the X-axis direction and is connected to a side of the second resonator 16 parallel to the X-axis direction. The connection line path 20 can be a path parallel to the Z-axis direction. The connection line path 20 can be a third resonator.

In FIG. 1, the connection line path 20 has been described as a linear path, but this is an example and does not limit the present disclosure. The connection line path 20 may include a plurality of paths such as a path parallel to the Z-axis direction and a path parallel to the XY plane.

The third resonator 22 can be arranged between the first resonator 14 and the second resonator 16 in the Z-axis direction. The third resonator 22 can be inside the opening 18*a* of the reference conductor 18. The third resonator 22 can be inside the opening 18*a* so as not to contact with the reference conductor 18. The third resonator 22 can be configured to be magnetically or capacitively connected to each of the first resonator 14 and the second resonator 16, for example. That is, the third resonator 22 is surrounded by the reference conductor 18. The third resonator 22 is capacitively connected to the reference conductor 18.

The feeder line 30 is electromagnetically connected to the first resonator 14. The feeder line 30 is configured to supply power to the first resonator 14. The input impedance of the feeder line 30 is, for example, 50Ω, but is not limited to this.

In the present embodiment, when a wavelength of a fundamental wave of the arriving electromagnetic wave is λ, the length of at least one side of the first resonator 14 is set to λ/2, the length of at least one side of the second resonator 16 is set to λ/2, and the length of at least one side of the third resonator 22 is set to λ/4.

In the present embodiment, the first resonator 14 is configured to transmit, to the feeder line 30, the electromagnetic wave received from the Z-axis direction.

The second resonator 16 is configured to resonate by a signal from the feeder line 30. The second resonator 16 is configured to radiate an electromagnetic wave when resonated by the signal from the feeder line 30. The second resonator 16 is configured to radiate the electromagnetic wave in the Z-axis direction when resonated by the signal from the feeder line 30. The second resonator 16 is configured to transmit, to the feeder line 30, the electromagnetic wave received from the −Z-axis direction.

The first resonator 14 is configured to radiate an electromagnetic wave when resonated by a signal from the feeder line 30. The first resonator 14 is configured to radiate the electromagnetic wave toward the Z-axis direction when resonated by the signal from the feeder line 30.

The second resonator 16 may be configured to resonate at a phase different from that of the first resonator 14 in response to the signal supplied from the feeder line 30. The second resonator 16 may be configured to resonate in a direction different from the resonance direction of the first resonator 14 in the XY plane direction when resonated by the signal from the feeder line 30. For example, when the first resonator 14 is configured to resonate in the X-axis direction, the second resonator 16 may be configured to resonate in the Y-axis direction.

The first resonator 14 and/or the second resonator 16 may be configured such that the resonance direction changes over time in the XY plane direction.

Figure 2:
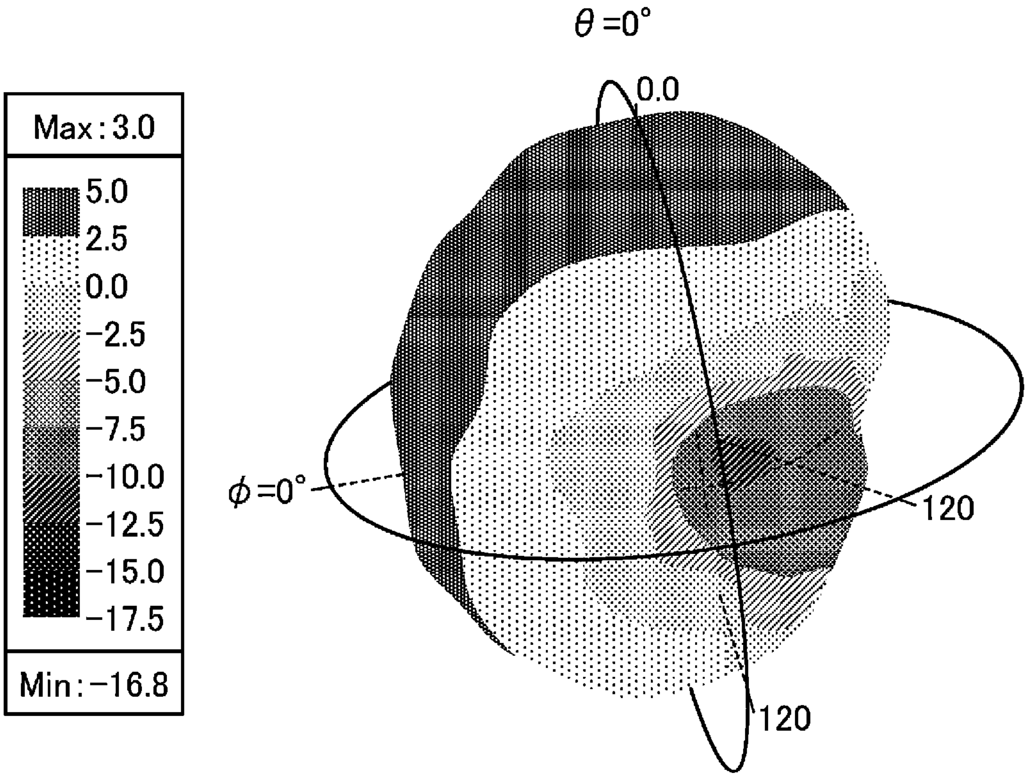
FIG. 2 is a view for illustrating a radiation pattern of the antenna according to the first embodiment.

A radiation pattern of the antenna according to the first embodiment will be described with reference to FIG. 2. FIG. 2 is a view for illustrating the radiation pattern of the antenna according to the first embodiment.

FIG. 2 illustrates a radiation pattern of an electromagnetic wave of the antenna 10 illustrated in FIG. 1. As illustrated in FIG. 2, the antenna 10 has large gains in the Z-axis direction and the −Z-axis direction. That is, the antenna 10 radiates the electromagnetic wave in the Z-axis direction and the −Z-axis direction.

Figure 3:
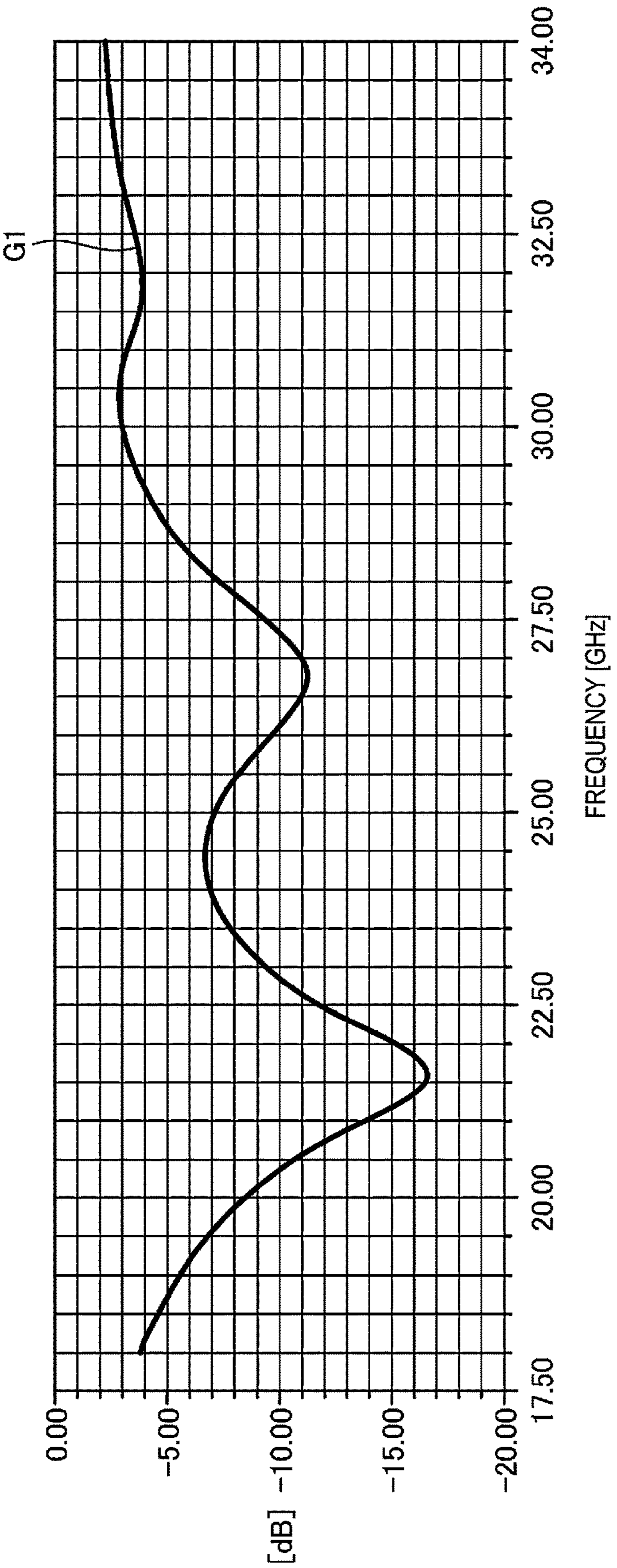
FIG. 3 is a graph showing frequency characteristics of the antenna according to the first embodiment.

Frequency characteristics of the antenna according to the first embodiment will be described with reference to FIG. 3. FIG. 3 is a graph showing the frequency characteristics of the antenna according to the first embodiment.

In FIG. 3, the horizontal axis represents the frequency [Giga Hertz (GHz)], and the vertical axis represents the gain [deci Bel (dB)]. FIG. 3 shows a graph G1. FIG. 3 shows a reflection coefficient of power supplied to the feeder line 30 of the antenna 10. As shown in FIG. 3, the gain of the reflection coefficient is equal to or less than −5 dB from the vicinity of 18.00 GHz to the vicinity of 28.00 GHz. That is, in the antenna 10, matching is achieved in a range from the vicinity of 18.00 GHz to the vicinity of 28.00 GHz.

Figure 4:
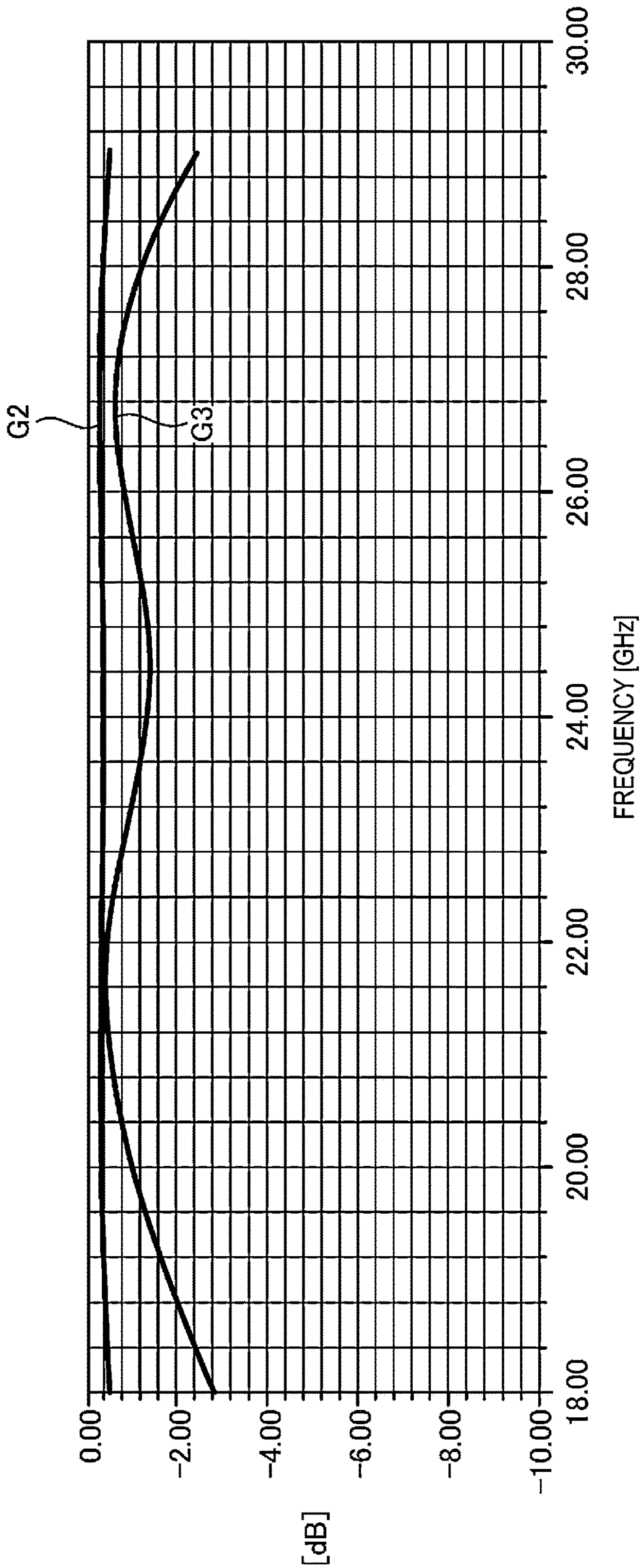
FIG. 4 is a graph showing radiation characteristics of the antenna according to the first embodiment.

Radiation characteristics of the antenna according to the first embodiment will be described with reference to FIG. 4. FIG. 4 is a graph showing the radiation characteristics of the antenna according to the first embodiment.

In FIG. 4, the horizontal axis represents the frequency [GHz], and the vertical axis represents the gain [dB]. FIG. 4 shows a graph G2 and a graph G3. The graph G2 shows radiation efficiency in the −Z-axis direction. The graph G3 shows radiation efficiency in the +Z-axis direction. As shown in the graphs G2 and G3, the radiation efficiency is equal to or greater than −3 dB from the vicinity of 18.00 GHz to the vicinity of 28.00 GHz. The antenna 10 has good radiation characteristics in the +Z-axis direction and the −Z-axis direction.

Figure 5:
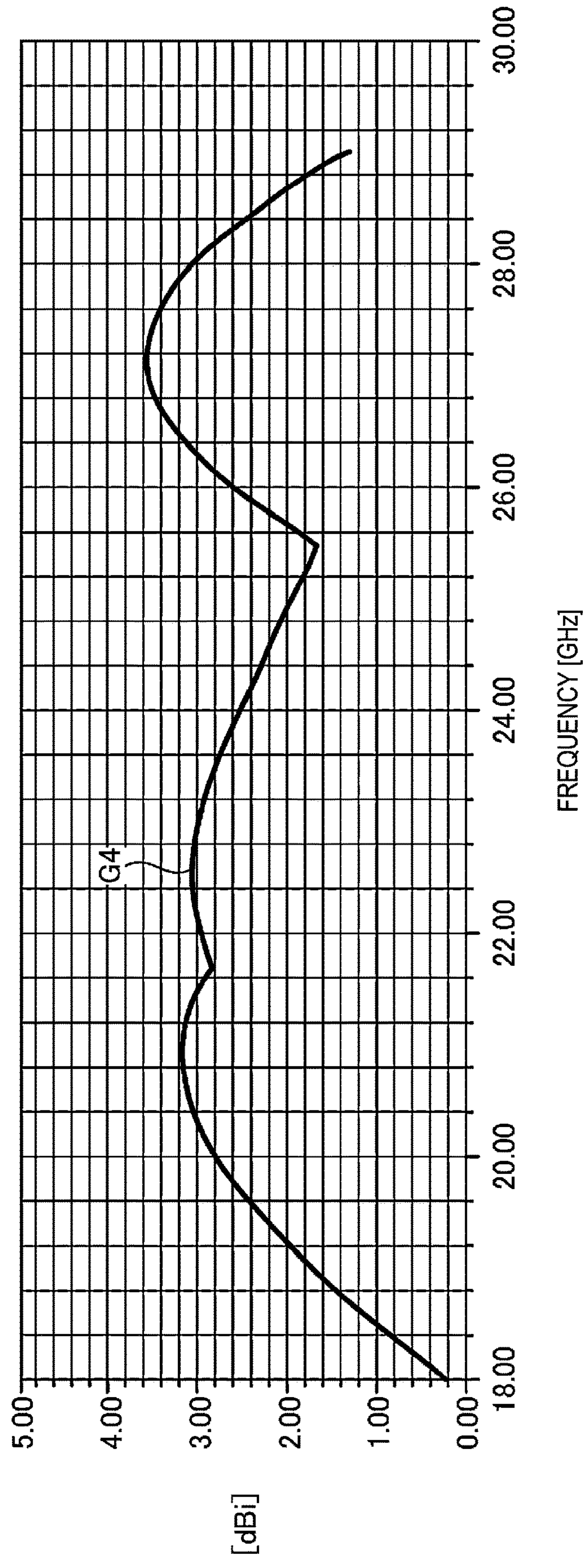
FIG. 5 is a graph showing a peak gain of the antenna according to the first embodiment.

The peak gain of the antenna according to the first embodiment will be described with reference to FIG. 5. FIG. 5 is a graph showing the peak gain of the antenna according to the first embodiment.

In FIG. 5, the horizontal axis represents the frequency [GHz], and the vertical axis represents the gain [dBi]. FIG. 5 shows a graph G4. As shown in FIG. 5, the peak gain is 4 dBi or lower from the vicinity of 18.00 GHz to the vicinity of 31.00 GHz. The antenna 10 has a good peak gain.

Second Embodiment

Figure 6:
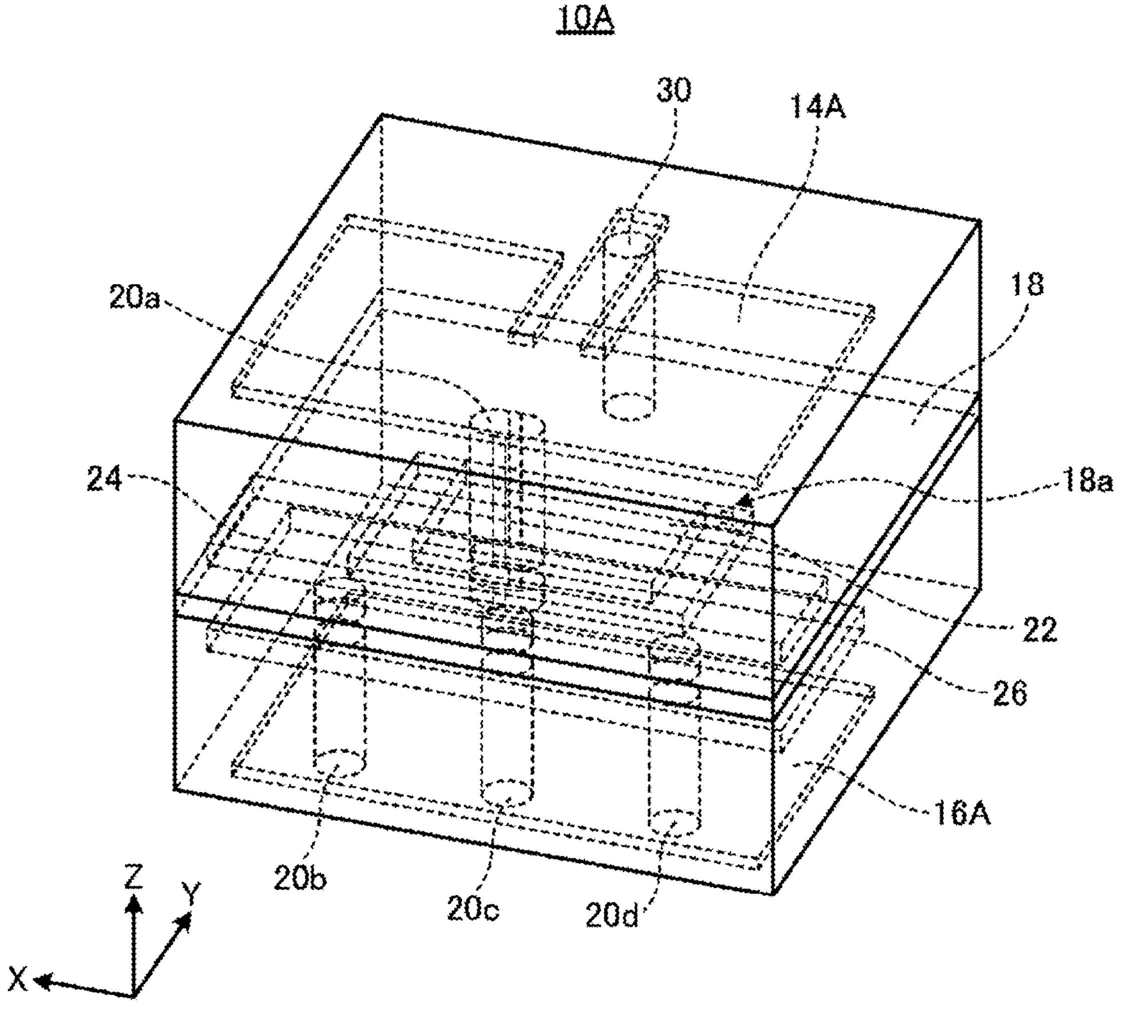
FIG. 6 is a view illustrating a configuration example of an antenna according to a second embodiment.

A configuration example of an antenna according to a second embodiment will be described with reference to FIG. 6. FIG. 6 is a view illustrating a configuration example of the antenna according to the second embodiment.

As illustrated in FIG. 6, an antenna 10A includes a first resonator 14A, a second resonator 16A, the reference conductor 18, a connection line path 20*a*, a connection line path 20*b*, a connection line path 20*c*, a connection line path 20*d*, the third resonator 22, a first auxiliary reference conductor 24, a second auxiliary reference conductor 26, and the feeder line 30.

The first resonator 14A is different from the first resonator 14 illustrated in FIG. 1 in that the length of at least one side is set to 214. The second resonator 16A is different from the second resonator 16 illustrated in FIG. 1 in that the length of at least one side is set to 214.

The first resonator 14A is configured to resonate by receiving an electromagnetic wave from the +Z-axis direction. The first resonator 14A is configured to radiate the electromagnetic wave when resonating. The first resonator 14A is configured to radiate the electromagnetic wave toward the +Z-axis direction when resonating.

The second resonator 16A is configured to radiate the electromagnetic wave when resonating. The second resonator 16A radiates the electromagnetic wave toward the −Z-axis direction when resonating. The second resonator 16A is configured to resonate by receiving the electromagnetic wave from the −Z-axis direction.

The second resonator 16A may be configured to resonate at a phase different from that of the first resonator 14A. The second resonator 16A may be configured to resonate in a direction different from the resonance direction of the first resonator 14A in the XY plane direction. For example, when the first resonator 14A is configured to resonate in the X-axis direction, the second resonator 16A may be configured to resonate in the Y-axis direction. The second resonator 16A may be configured such that the resonance direction of the second resonator 16A changes over time in the XY plane direction with respect to the resonance direction of the first resonator 14A. The second resonator 16A may be configured to attenuate a first frequency band of the electromagnetic wave received by the first resonator 14A and radiate the resultant electromagnetic wave.

The third resonator 22 can be arranged between the first resonator 14A and the second resonator 16A in the Z-axis direction. The third resonator 22 can be inside the opening 18*c* of the reference conductor 18. The third resonator 22 can be inside the opening 18*c* so as not to contact with the reference conductor 18. That is, the third resonator 22 is surrounded by the reference conductor 18.

The first auxiliary reference conductor 24 can be arranged between the first resonator 14A and the reference conductor 18. The first auxiliary reference conductor 24 can be made of a conductor. The second auxiliary reference conductor 26 can be arranged between the second resonator 16A and the reference conductor 18. The second auxiliary reference conductor 26 can be made of a conductor.

One end of the connection line path 20*a* is electromagnetically connected to the first resonator 14A. The connection line path 20*a* passes through the first auxiliary reference conductor 24, and the other end of the connection line path 20*a* is electrically connected to the reference conductor 18. The connection line path 20*a* is electromagnetically connected to the first auxiliary reference conductor 24. The connection line path 20*a* can also be referred to as a first connection line path.

One end of each of the connection line path 20*b*, the connection line path 20*c*, and the connection line path 20*d* is electromagnetically connected to the second resonator 16A. The connection line path 20*b*, the connection line path 20*c*, and the connection line path 20*d* pass through the second auxiliary reference conductor 26, and the other end of each of the connection line path 20*b*, the connection line path 20*c*, and the connection line path 20*d* is electromagnetically connected to the reference conductor 18. The connection line path 20*b*, the connection line path 20*c*, and the connection line path 20*d* are electromagnetically connected to the second auxiliary reference conductor 26. Each of the connection line path 20*b*, the connection line path 20*c*, and the connection line path 20*d* can also be referred to as a second connection line path.

The feeder line 30 is electromagnetically connected to the first resonator 14A. The feeder line 30 is configured to supply power to the first resonator 14. The input impedance of the feeder line 30 is, for example, 50Ω, but is not limited to this.

Figure 7:
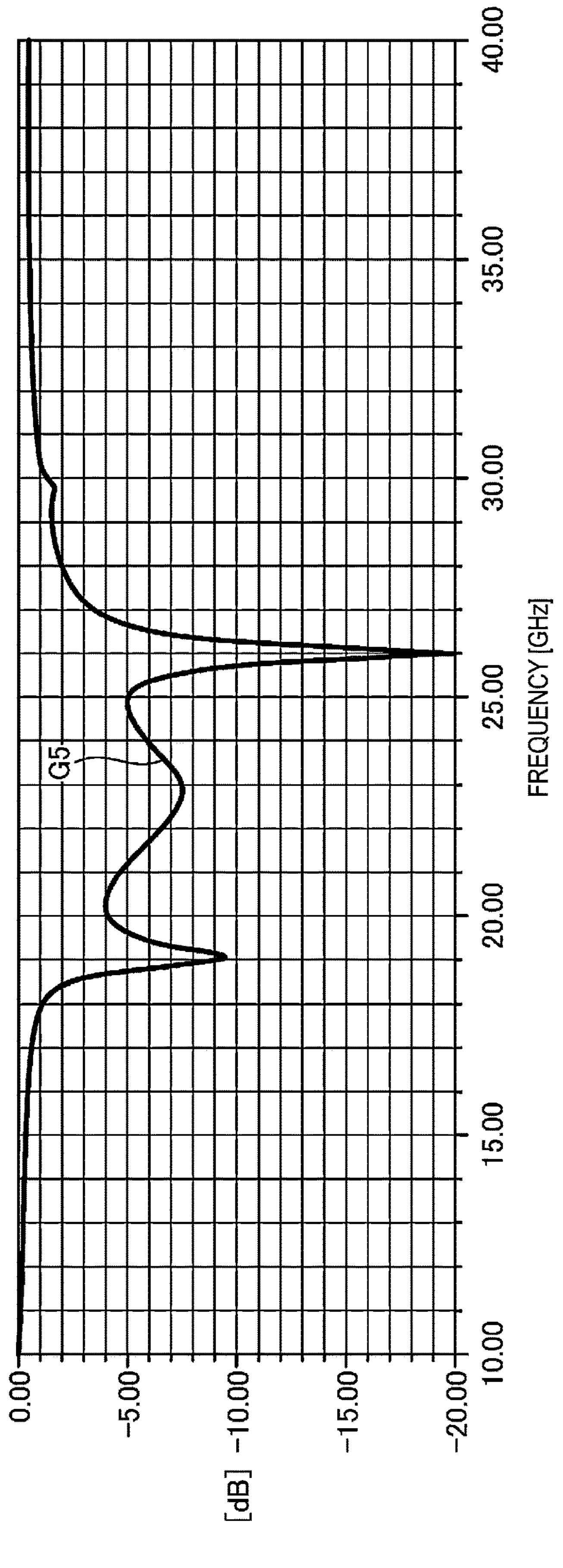
FIG. 7 is a graph showing frequency characteristics of the antenna according to the second embodiment.
Figure 8:
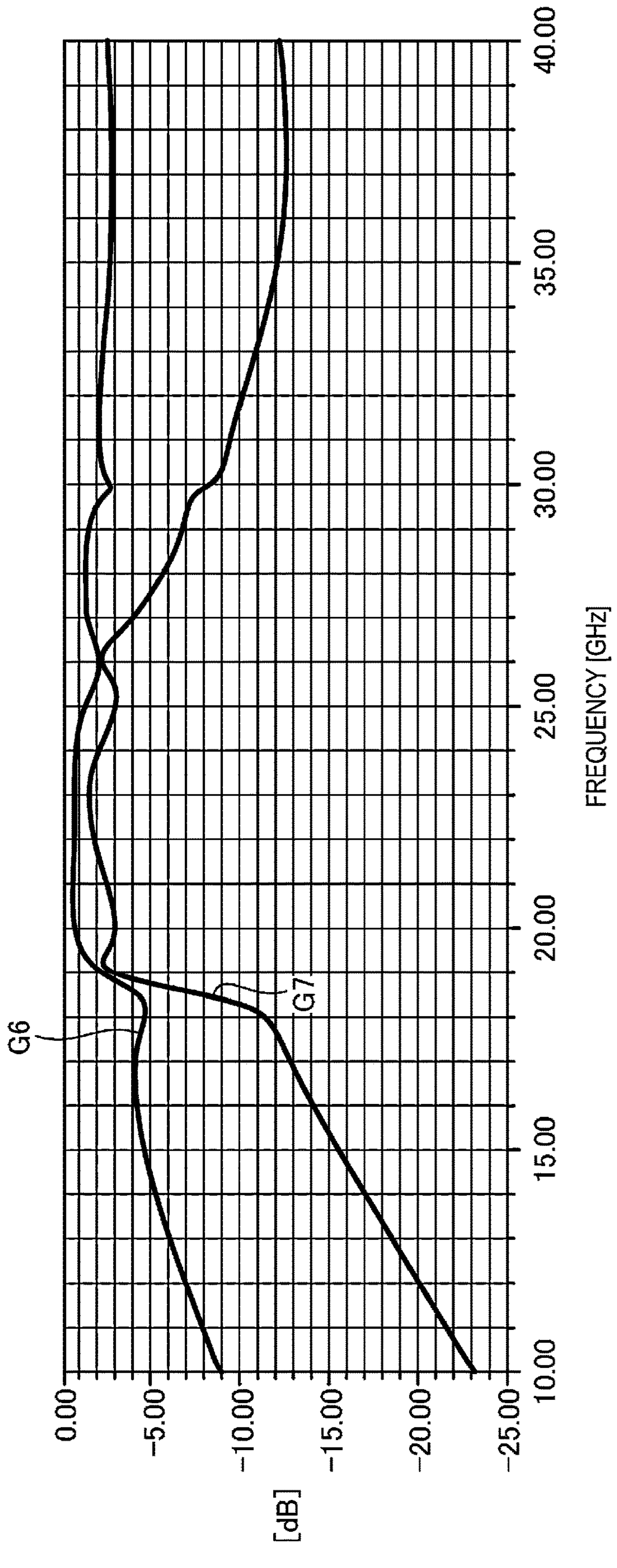
FIG. 8 is a graph showing frequency characteristics of the antenna according to the second embodiment.

Frequency characteristics of the antenna according to the second embodiment will be described with reference to FIGS. 7 and 8. FIGS. 7 and 8 are graphs showing the frequency characteristics of the antenna according to the second embodiment.

In FIG. 7, the horizontal axis represents the frequency [GHz], and the vertical axis represents the gain [dB]. FIG. 7 shows a graph G5. The graph G5 shows a reflection coefficient. For example, a gain of a frequency band in the vicinity of 19.00 GHz is about −9.4 dB. For example, a gain of a frequency band in the vicinity of 23.00 GHz is about −7.4 dB. For example, a gain of a frequency band in the vicinity of 26.00 GHz is about −19.9 dB.

In FIG. 8, the horizontal axis represents the frequency [GHz], and the vertical axis represents the gain [dB]. FIG. 8 shows a graph G6 and a graph G7. The graph G6 shows radiation efficiency in the −Z-axis direction. The graph G7 shows radiation efficiency in the +Z-axis direction. As shown in the graphs G6 and G7, the radiation efficiency is equal to or greater than −3 dB from the vicinity of 19.00 GHz to the vicinity of 26.00 GHz. The antenna 10A has good radiation characteristics in the +Z-axis direction and the −Z-axis direction.

Figure 9:
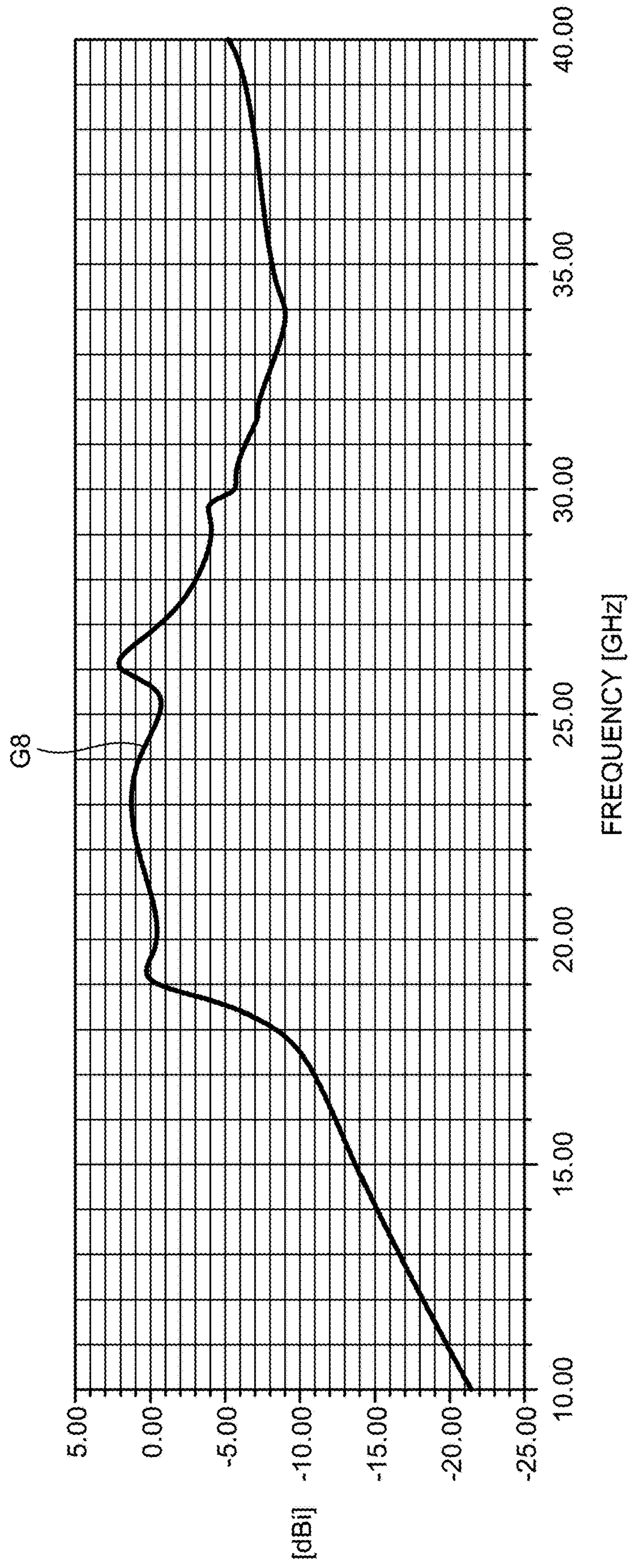
FIG. 9 is a graph showing a peak gain of the antenna according to the second embodiment.

The peak gain of the antenna according to the second embodiment will be described with reference to FIG. 9. FIG. 9 is a graph showing the peak gain of the antenna according to the second embodiment.

In FIG. 9, the horizontal axis represents the frequency [GHz], and the vertical axis represents the gain [dBi]. FIG. 9 shows a graph G8. As shown in FIG. 9, the peak gain is equal to or greater than −1 dBi from the vicinity of 19.00 GHz to the vicinity of 26.00 GHz. The antenna 10A has good peak characteristics.

Figure 10:
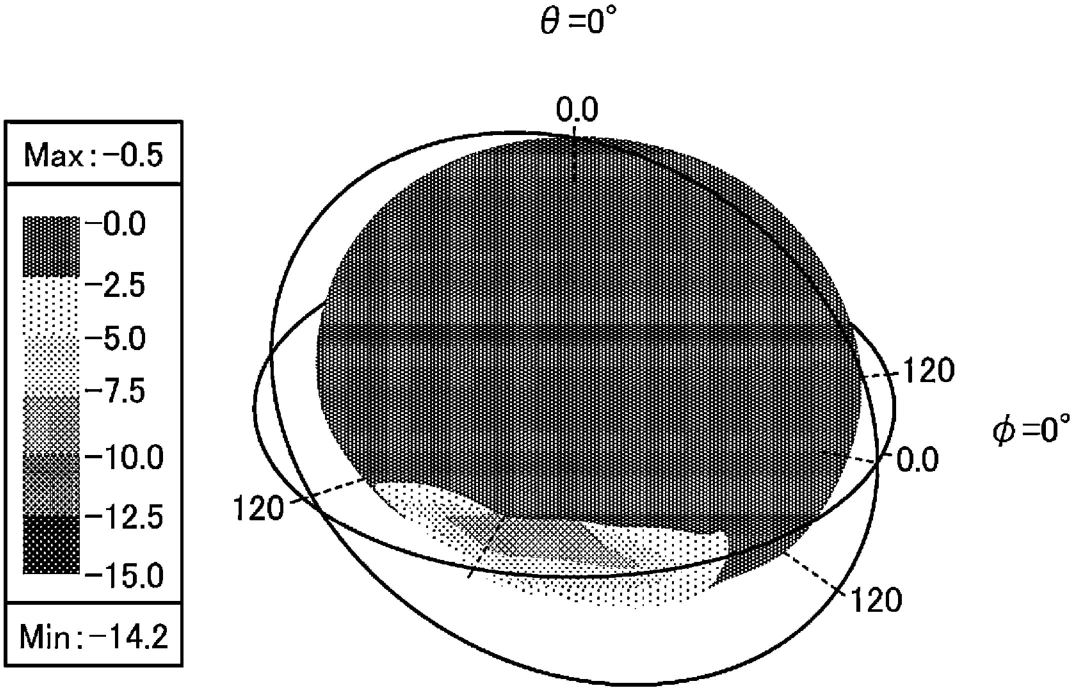
FIG. 10 is a view for illustrating a radiation pattern of the antenna according to the second embodiment.
Figure 11:
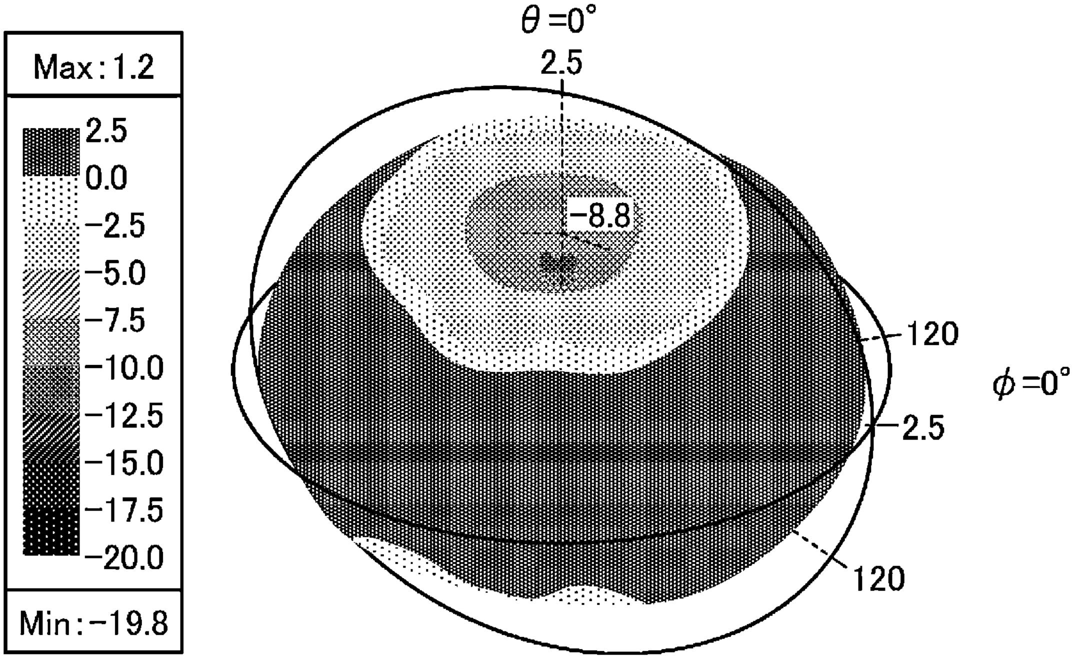
FIG. 11 is a view for illustrating a radiation pattern of the antenna according to the second embodiment.
Figure 12:
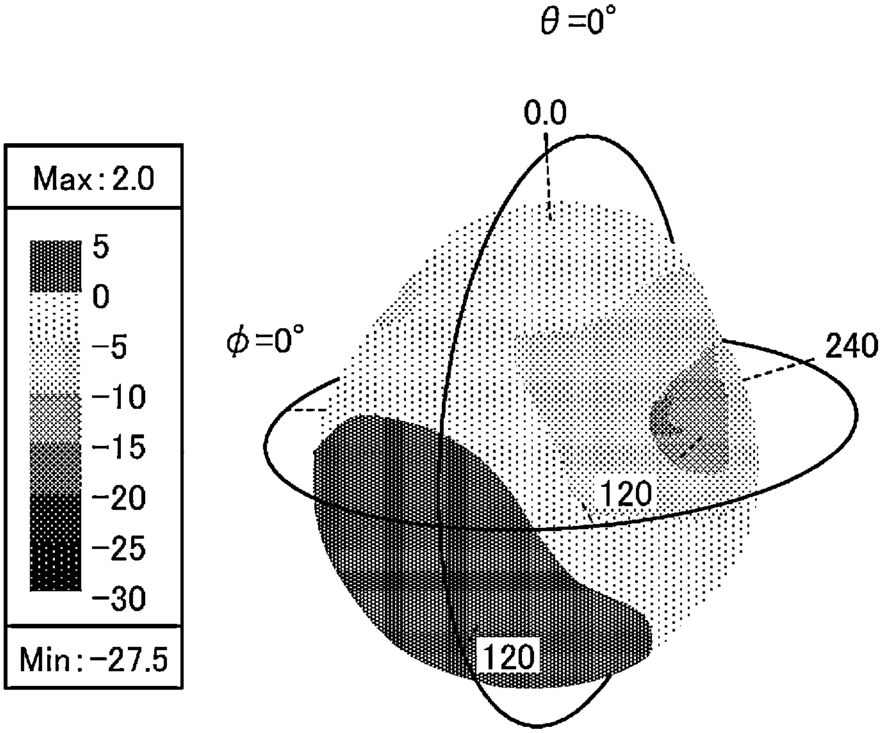
FIG. 12 is a view for illustrating a radiation pattern of the antenna according to the second embodiment.

A radiation pattern of the antenna according to the second embodiment will be described with reference to FIGS. 10, 11, and 12. FIGS. 10 to 12 are views for illustrating the radiation pattern according to the second embodiment.

FIG. 10 illustrates a radiation pattern of the antenna 10A at a frequency of 19 GHz. FIG. 11 illustrates a radiation pattern of the antenna 10A at a frequency of 23 GHz. FIG. 12 illustrates a radiation pattern of the antenna 10A at a frequency of 26 GHz. As illustrated in FIG. 10, when the frequency is 19 GHz, the maximum value of the gain is −0.5 dB, and the minimum value of the gain is −14.2 dB. As illustrated in FIG. 11, when the frequency is 23 GHz, the maximum value of the gain is 1.2 dB and the minimum value of the gain is −19.8 dB. As illustrated in FIG. 12, when the frequency is 26 GHz, the maximum value of the gain is 2.0 dB, and the minimum value of the gain is −27.5 dB.

OTHER EMBODIMENTS

Figure 13:
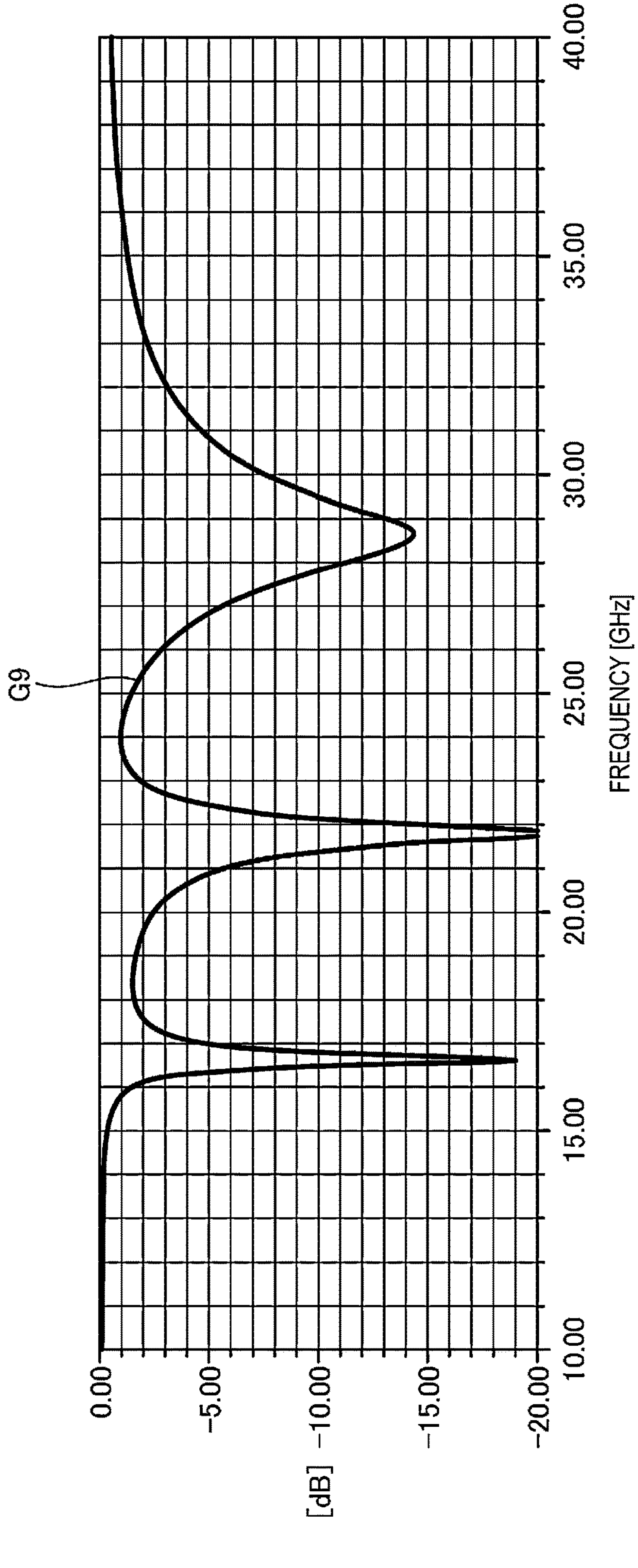
FIG. 13 is a graph showing frequency characteristics of the antenna according to other embodiments.

Frequency characteristics of an antenna according to other embodiments will be described with reference to FIG. 13. FIG. 13 is a graph showing the frequency characteristics of the antenna according to other embodiments.

In FIG. 13, the horizontal axis represents the frequency [GHz], and the vertical axis represents the gain [dB]. FIG. 13 shows a graph G9. The graph G9 shows a reflection coefficient of a triple-band compatible antenna. For example, a gain of a frequency band in the vicinity of 19.00 GHz is about −1.5 dB. For example, a gain of a frequency band in the vicinity of 23.00 GHz is about −2 dB. For example, a gain of a frequency band in the vicinity of 26.00 GHz is about −3 dB.

Embodiments of the present disclosure have been described above, but the present disclosure is not limited by the contents of the embodiments. Constituent elements described above include those that can be easily assumed by a person skilled in the art, those that are substantially identical to the constituent elements, and those within a so-called range of equivalency. The constituent elements described above can be combined as appropriate. Various omissions, substitutions, or modifications of the constituent elements can be made without departing from the spirit of the above-described embodiments.

The invention claimed is:

1. An antenna comprising:

a first resonator extending in a first plane direction;

a second resonator spaced apart from the first resonator in a first direction and extending in the first plane direction;

third resonator positioned between the first resonator and the second resonator in the first direction and configured to be magnetically or capacitively connected to or electrically connected to each of the first resonator and the second resonator;

a reference conductor extending in the first plane direction, positioned between the first resonator and the second resonator in the first direction, and serving as a potential reference of the first resonator and the second resonator; and a feeder line connected to the first resonator, wherein the reference conductor surrounds at least a part of the third resonator in the first plane direction.

2. The antenna according to claim 1, wherein the reference conductor comprises a through hole, and wherein the third resonator is magnetically or capacitively connected to or electrically connected to each of the first resonator and the second resonator via the through hole.

3. The antenna according to claim 1,
wherein the first resonator transmits, to the feeder line, an electromagnetic wave received from a forward direction of the first direction.

4. The antenna according to claim 1,
wherein the second resonator radiates an electromagnetic wave when resonated by a signal from the feeder line.

5. The antenna according to claim 4,
wherein the second resonator radiates an electromagnetic wave in a backward direction of the first direction when resonated by the signal from the feeder line.

6. The antenna according to claim 5,
wherein the second resonator transmits, to the feeder line, an electromagnetic wave received from a backward direction of the first direction.

7. The antenna according to claim 1,
wherein the first resonator radiates an electromagnetic wave when resonated by a signal from the feeder line.

8. The antenna according to claim 1,
wherein the first resonator radiates an electromagnetic wave in a forward direction of the first direction when resonated by the signal from the feeder line.

9. The antenna according to claim 1,
wherein the second resonator resonates at a phase different from a phase of the first resonator in response to the signal supplied from the feeder line.

10. The antenna according to claim 1,
wherein the second resonator resonates, in the first plane direction, in an in-plane direction different from an in-plane direction of the first resonator when resonated by supply from the feeder line.

11. The antenna according to claim 1,
wherein a resonance direction of the first resonator and/or the second resonator changes over time in the first plane direction.

12. An antenna comprising:
a first resonator extending in a first plane direction;
a second resonator spaced apart from the first resonator in a first direction and extending in the first plane direction;
a reference conductor extending in the first plane direction, positioned between the first resonator and the second resonator in the first direction, and serving as a potential reference of the first resonator and the second resonator;
a third resonator positioned between the first resonator and the second resonator in the first direction and configured to be magnetically or capacitively connected to or electrically connected to each of the first resonator and the second resonator;
a first auxiliary reference conductor positioned between the first resonator and the reference conductor and extending in the first plane direction;
a second auxiliary reference conductor positioned between the second resonator and the reference conductor and extending in the first plane direction;
a first connection line path configured to electromagnetically connect the first resonator, the reference conductor, and the first auxiliary reference conductor; and
a second connection line path configured to electromagnetically connect the second resonator, the reference conductor, and the second auxiliary reference conductor,
wherein the reference conductor surrounds at least a part of the third resonator in the first plane direction.

13. An array antenna comprising:
one or more antennas according to claim 1,
wherein the one or more antennas are arranged in the first plane direction.

* * * * *